United States Patent [19]

Meess et al.

[11] Patent Number: 4,950,105
[45] Date of Patent: Aug. 21, 1990

[54] INSPECTABLE VAULT SYSTEM FOR THE DISPOSAL OF RADIOACTIVE WASTE HAVING A LIQUID COLLECTION SYSTEM

[75] Inventors: Daniel C. Meess; William H. Hamilton, Jr., both of Murrysville; Wayne J. Severson, Pittsburgh; James B. Wright; Thomas G. Weiss, Jr., both of Murrysville, all of Pa.

[73] Assignee: Westinghouse Electric Corp., Pittsburgh, Pa.

[21] Appl. No.: 330,672

[22] Filed: Mar. 30, 1989

[51] Int. Cl.⁵ .............................................. B65G 5/00
[52] U.S. Cl. .................................... 405/128; 405/52; 405/129
[58] Field of Search .................. 405/128, 129, 53, 54, 405/52; 52/169.6, 21, 169.5

[56] References Cited

U.S. PATENT DOCUMENTS

| | | |
|---|---|---|
| 4,171,002 | 10/1979 | Smith . |
| 4,171,921 | 10/1979 | Morfeldt . |
| 4,350,461 | 9/1982 | Valiga et al. . |
| 4,352,601 | 10/1982 | Valiga et al. . |
| 4,362,434 | 12/1982 | Valiga et al. . |
| 4,415,459 | 11/1983 | Coffmann et al. . |
| 4,439,062 | 3/1984 | Kingsbury . |
| 4,453,857 | 6/1984 | Serra et al. ................ 405/129 X |
| 4,458,458 | 7/1984 | Orii . |
| 4,464,081 | 8/1984 | Hillier et al. . |
| 4,495,139 | 1/1985 | Janberg et al. . |
| 4,513,205 | 4/1985 | Splinter . |
| 4,543,013 | 9/1985 | Wagner et al. . |
| 4,594,513 | 6/1986 | Suzuki et al. . |
| 4,678,369 | 7/1987 | Glaser ............................ 405/129 |
| 4,701,280 | 10/1987 | Canevall . |
| 4,776,982 | 10/1988 | Canevall . |
| 4,784,802 | 11/1988 | Mallory et al. ............... 405/128 X |
| 4,810,131 | 3/1989 | Turner .......................... 405/129 |
| 4,842,774 | 6/1989 | Golden ......................... 405/128 X |
| 4,844,840 | 7/1989 | Feizollahi .................... 405/128 X |
| 4,846,604 | 7/1989 | Holtmann ..................... 405/128 |

Primary Examiner—Dennis L. Taylor

[57] ABSTRACT

A vault system is disclosed herein for the disposal of hazardous waste formed from vault cells, each of which has a liquid collection and monitoring system. Each vault cell comprises a liquid impermeable floor slab having a drainage channel for collecting liquids, a wall assembly disposed around the periphery of the floor slab, a ceiling slab overlying the wall upper edge of the assembly, and a monitoring and inspection aisleway disposed between the wall assembly and radioactive waste stacked within the vault cell that encompasses the drainage channel to render it both observable and accessible. The floor slab includes a plurality of feeder channels arranged in a rectangular grid pattern that ultimately drain into the drainage channel and are arranged such that each feeder channel collects liquid from a different rectangular zone within the floor slab so that the location of a leakage condition may be generally determined by observing which feeder channel conveys liquid to the drainage channel. A drainage conduit located out of the vault cell includes a transparent trap with a color float for indicating whether liquid is present in the conduit. Each drainage conduit is drained into a manifold conduit which is in turn connected to a collection tank. The flotation device of each drain conduit is rendered accessible and directly observable by means of a subterranean tunnel that links the ends of all such drainage conduits together.

30 Claims, 5 Drawing Sheets

FIG. I

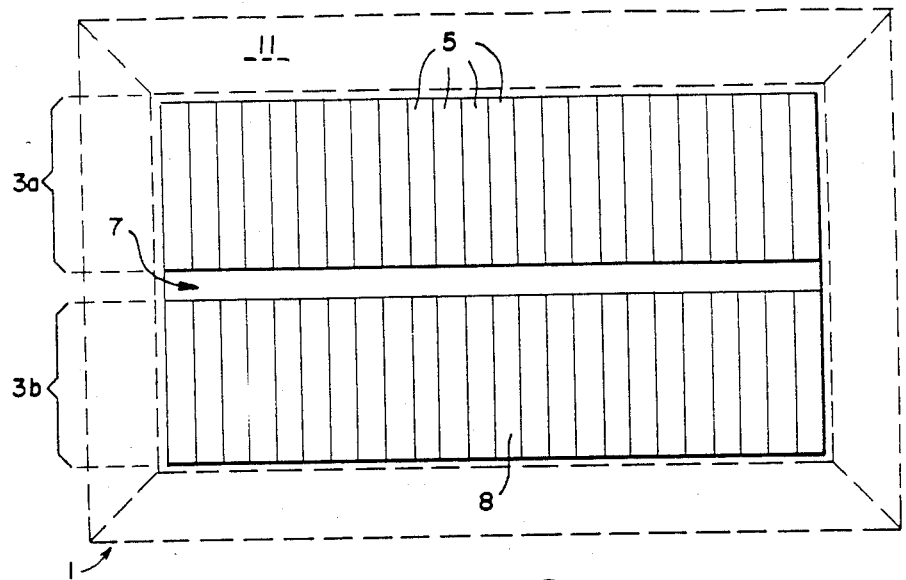
FIG. 2
FIG. 3
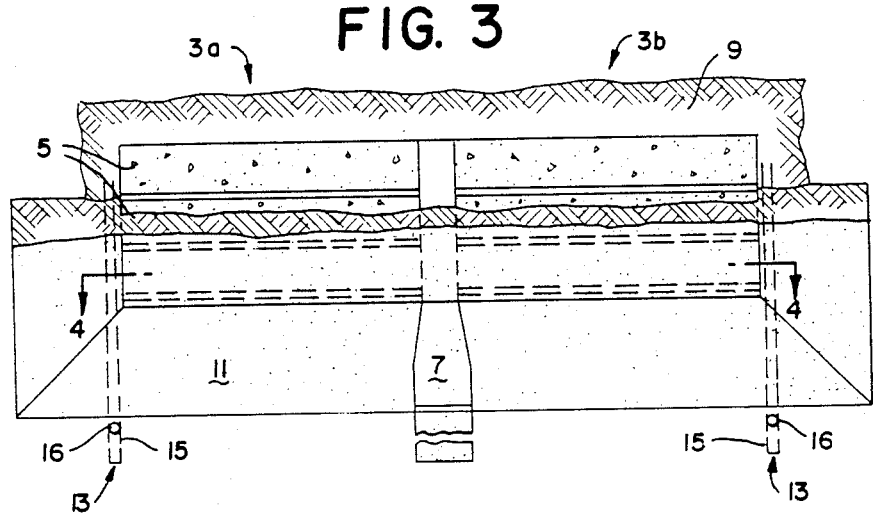
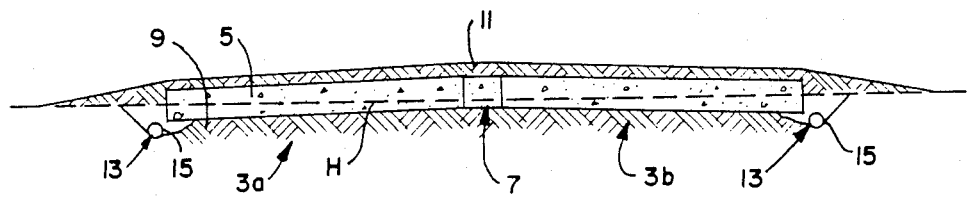
FIG. 4

INSPECTABLE VAULT SYSTEM FOR THE DISPOSAL OF RADIOACTIVE WASTE HAVING A LIQUID COLLECTION SYSTEM

BACKGROUND OF THE INVENTION

This invention generally relates to burial systems for the disposal of hazardous waste, and is specifically concerned with a vault system for the underground disposal of low-level radioactive waste that is formed from a plurality of vault cells, each of which is inspectable and has its own liquid collection and monitoring system.

Burial systems for the disposal of radioactive waste are known in the prior art. Generally, such burial systems include a floor formed from a generally impermeable material, which may be compacted clay, over which a layer of water-permeable gravel is disposed. The walls and ceilings of such systems may be earthen, or formed from poured concrete. One of the design objectives of such systems is to isolate ground water from radioactive contamination. Ground water can penetrate structural faults in the burial site caused by seismic disturbances or faulty construction, and contamination can be leached out of the radioactive waste deposited in such sites if the waste is submerged in this water for a significant period of time. To prevent ground water from collecting on the floor of such burial sites, a drainage system in the form of a network of drain pipes may be installed between the water impermeable floor and the layer of gravel that forms the bottom of the burial site. In some of these systems, suction is periodically applied to one or more of the drain pipes to see whether or not water has begun to collect therein. In other types of prior art systems, the network of drain files empties into a collection basin which may be periodically monitored.

Unfortunately, there are a number of shortcomings associated with these prior art burial systems that interfere with their ability to reliably and effectively prevent ground water from being contaminated with radioactive waste. For example, many of these systems do not provide an immediate and automatic indication of the presence of a leakage condition. Instead, such a leakage condition can only be found when the system operators take it upon themselves to monitor the water level within the burial site or within a collection basin. Even more importantly, the applicants have observed that none of the prior art systems provides any indication as to the location of a water leakage condition within a particular burial site. This deficiency, in conjunction with the fact that none of these systems provides convenient access to the waste disposed therein once the burial site has been sealed shut, may cause such prior art burial sites to be completely due up and reconstructed when the presence of a leakage condition is detected. The complete reconstruction of such a site and the temporary removal of the waste disposed therein would not only be extremely expensive, but would also expose the workers to potentially harmful radiation.

Clearly, a burial system for the disposition of radioactive waste is needed that automatically provides a clear signal of a leakage condition once water begins to collect therein. Ideally, such a system should have some sort of means for locating the cause of the leakage condition within the burial site, and should further provide some sort of means for readily accessing the waste disposed within the site so that the necessary repairs may be made easily and expeditiously and with a minimum amount of radiation exposure to the workers.

SUMMARY OF THE INVENTION

Generally speaking, the invention is a vault system for the disposal of hazardous waste, such as low-level radioactive waste, that is formed from a plurality of vault cells, each of which has its own liquid collection and monitoring system. Each of the vault cells comprises a liquid impermeable floor slab having a drainage channel along one of its edges, a wall assembly disposed around the periphery of the floor slab, a ceiling slab overlying the wall assembly, and a monitoring aisleway defined between the wall assembly and the radioactive waste deposited on the floor slab wherein the drainage channel of the floor slab is encompassed within the monitoring aisleway so that the location of the origination of a flow of liquid toward the drainage channel may be easily observed.

A drainage conduit located outside of the vault cell is fluidly connected to the drainage channel in order to remove liquid from the vault cell. The drainage conduit preferably includes a means for indicating whether liquid is present in the conduit. The indicator means may take any one, of a number of forms, including a colored float in a transparent elbow connected to the end of the conduit or an electronic moisture sensor which remotely relays an alarm signal when liquid is detected in either the conduit or the drainage channel. The vault system preferably includes a plurality of vault cells, each with its own separate drainage conduit. The drainage conduits may be connected to a manifold which in turn is connected to a liquid collection and storage tank that prevents contaminants from coming into contact with ground water. The liquid indicator means located at one end of each of the drainage conduits are all accessible by way of a subterranean tunnel so that both the indicator means and the junctions of each of these drainage conduits into the manifold may be directly and manually inspected.

The floor slab may include a plurality of feeder channels arranged in a rectangular gridwork that ultimately communicate with the drainage channel and are arranged such that each feeder channel collects liquid from a different rectangular zone within the floor slab. Such feeder channels allow the system operators to determine the location of a leakage condition with respect to the floor slab.

A track for both supporting and guiding a monitoring and inspecting device, such as a remotely movable television camera with its own light source, is preferably mounted around the wall assembly over the drainage channel. In operation, the television camera can provide an indication to the system operator as to which feeder channels (and hence which rectangular zones of the floor slab) are experiencing a leakage condition. To facilitate the installation of such a television camera unit within the vault cell, the loading accessway of the vault cell is covered with a removable wall assembly formed from interfitting blocks which may be lifted out of the wall to provide an access port if desired.

Hence, the vault system of the invention not only provides a safe and reliable means for consolidating and disposing liquids that collect within the vault cells; it also monitors both the presence and the amounts o such liquids, and determines the location of a leakage condition within each individual vault cell. These features, in conjunction with the accessibility afforded to the radioactive waste after the vault cells have been filled and sealed, allows the system operators to quickly and easily correct the cause of any given leakage condition.

BRIEF DESCRIPTION OF THE SEVERAL FIGURES

FIG. 2 is a plan view of the vault system illustrated in FIG. 1, illustrating the parallel configuration of the two rows of vault cells that form the vault system;

FIG. 3 is an enlarged plan view of the vault system illustrated in FIG. 2, illustrating some of the layers of the earth cap that cover the individual vault cells of the system;

FIG. 4 is a cross-sectional view of the vault system illustrated in FIG. 3 along the line 4—4;

Figure 6C:
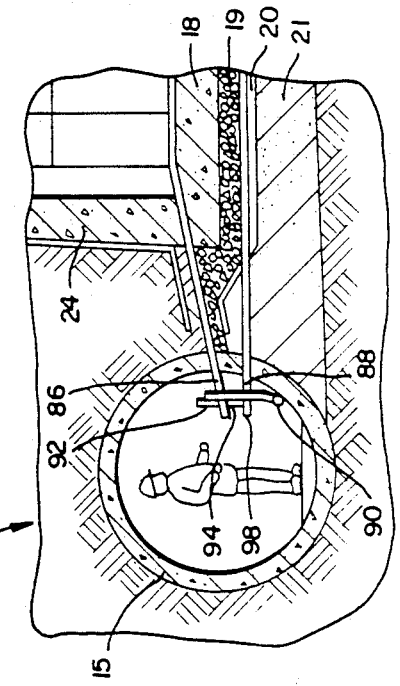
FIG. 6A is another plan view of the vault system as shown without either the earth cap, the ceiling slabs, or the waste modules so that the drainage channel and gridwork of feeder channels present in the ceiling slabs of each vault cell may be easily seen.
FIG. 6B is an enlarged cross-sectional side view of one of the drainage or feeder channels in a ceiling slab of a vault cell.
Figure 7:
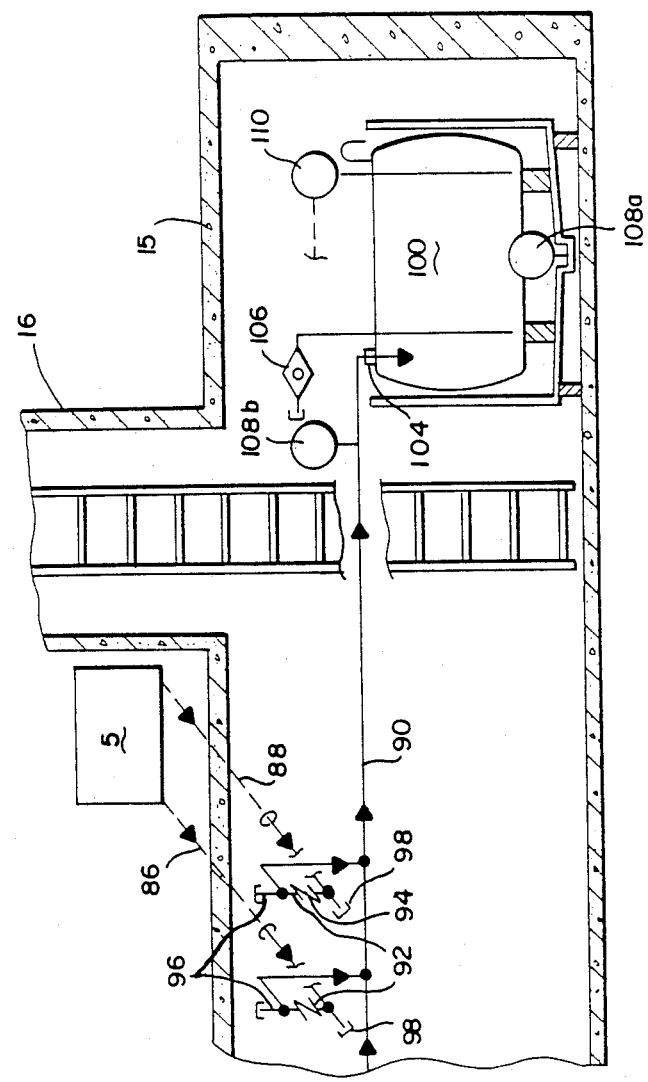

FIG. 6C is an enlarged cross-sectional side view of the access tunnel of the drainage system which allows the system operators to obtain access to both the primary and secondary drainage conduits and the manifold which interconnects them, and FIG. 7 is a partial cross-sectional side view of the access tunnel of the drainage system, illustrating the liquid collection tank connected to the manifold conduit of the drainage system.

DETAILED DESCRIPTION OF THE PREFERRED EMBODIMENT

Figure 1:
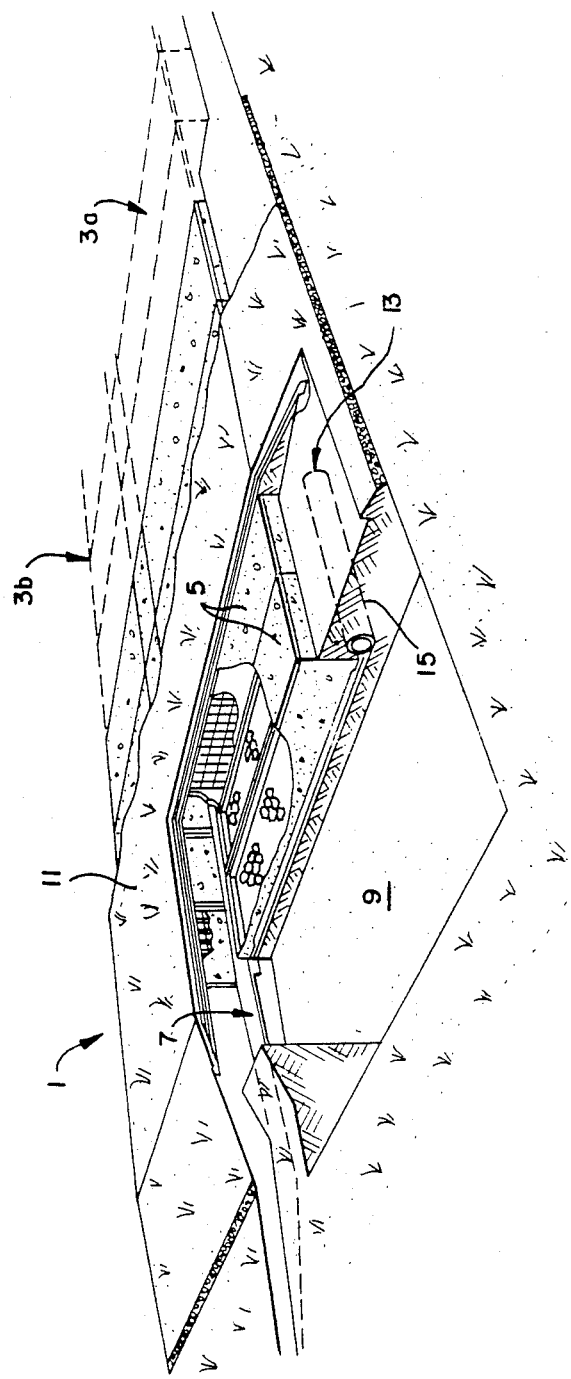
FIG. 1 is a perspective view of the inspectable vault system embodying the invention.

With reference now to FIGS. 1 and 2, wherein like numerals designate like components throughout all of the several figures, the inspectable vault system 1 of the invention is generally comprised of two parallel rows 3a,3b of vault cells 5, each of which preferably includes twenty-five cells a piece. The two rows 3a,3b of vault cells 5 are separated by a loading aisle 7 that provides access to the side-opening present in each cell 5. One of the rows 3b of vault cells 5 includes one cell 8 which remains empty after all of the remaining vault cells 5 have been filled. As will be described in more detail hereinafter, the empty cell 8 provides valuable temporary "parking" room for the waste container stacked within one of the other vault cells 5 when it is necessary to service a leak condition occurring in one of the loaded cells 5. Both of the rows 3a,3b of cells 5 are subterranean, being placed within a recess 9 in the earth which may be either a natural below-grade topological feature or formed by excavation. The two rows 3a,3b of cells 5 are covered by an earth cap 11 formed in part from water-shedding compacted clay and a geomembrane material. A drainage system 13 for removing water and other liquids which may collect within the vault system 1 circumscribes the two rows 3a,3b of vault cells 5. The drainage system 13 generally includes an access tunnel 15 that allows a system operator to access a liquid manifold that communicates with each of the vault cells 5. Manholes 16 are provided at the ends of the access tunnel 15 to allow a system operator to climb underground into the tunnel 15.

Figure 5A:
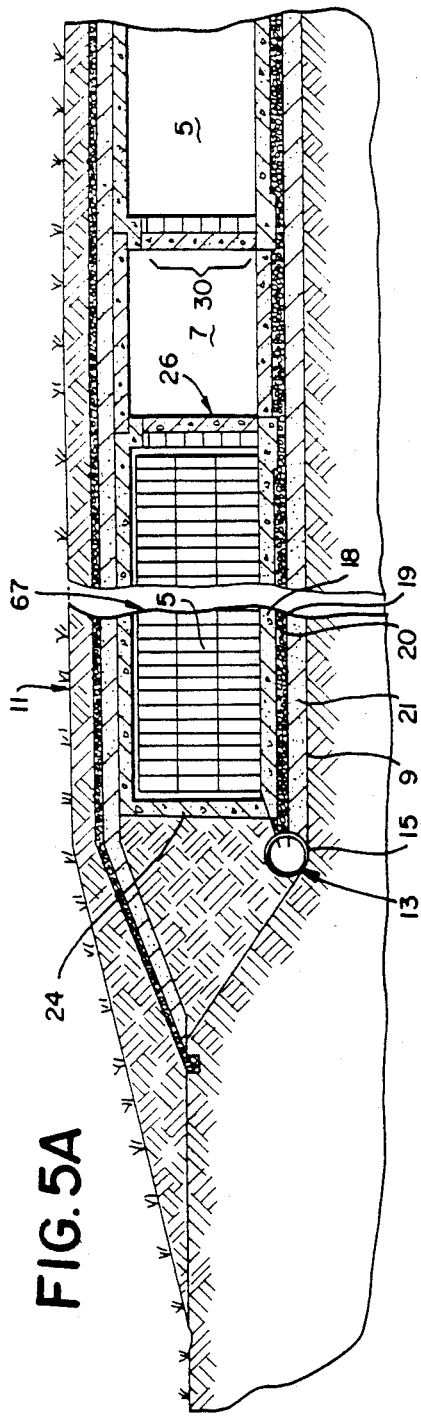
FIG. 5A is an enlarged cross-sectional side view of the vault system.

With reference now to FIGS. 3, 4 and 5A, each of the vault cells 5 of the system 1 includes a floor slab 18 which is preferably approximately one meter thick. As is best seen in FIG. 4, the floor slab 18 of each cell 5 is sloped with respect to the horizontal H to encourage water or other liquids which may collect within the cells to drain toward the drainage system 13. A relatively small slope of approximately one to three percent should be sufficient for such drainage purposes. Each floor slab 18 is also sloped in the direction transverse to the "down hill" slope evident in FIG. 4 so that any liquids collected within the cells 5 will flow toward a specific corner of the cell 5. Of course the floor slab 18 should be formed from a substance which is relatively liquid impermeable, such as hardened concrete.

Figure 5B:
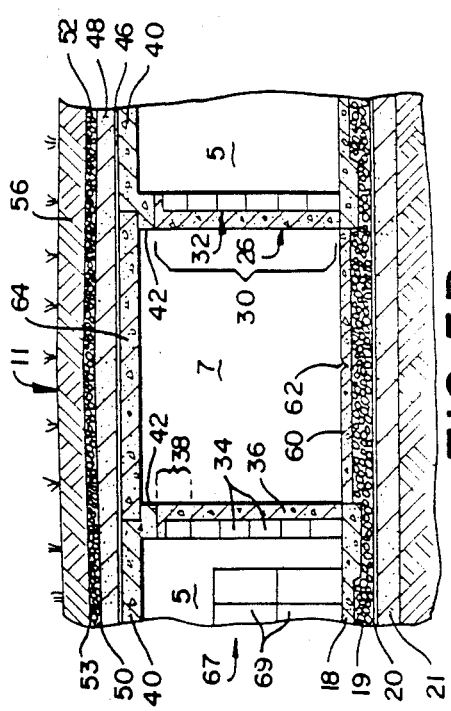
FIG. 5B is an enlarged cross-sectional side view of the loading aisle of the vault system illustrated in FIG. 5B.

As is best seen with respect to FIGS. 5A and 5B, the floor slab 18 of each individual vault cell 5 rests on top of a gravel drain layer 19 which in turn overlies a water impermeable geomembrane 20 that may be formed from polyvinylchloride or other appropriate hydrophobic material. Geomembrane 20 in turn lies over a compacted layer of clay 21 which is preferably at least about one meter thick. The purpose of all of the underlying floor layers 19, 20 and 21 is, of course, to encourage any liquids which may seep through the floor slab 18 of a particular cell 5 to flow into the drainage system 13.

Figure 5C:
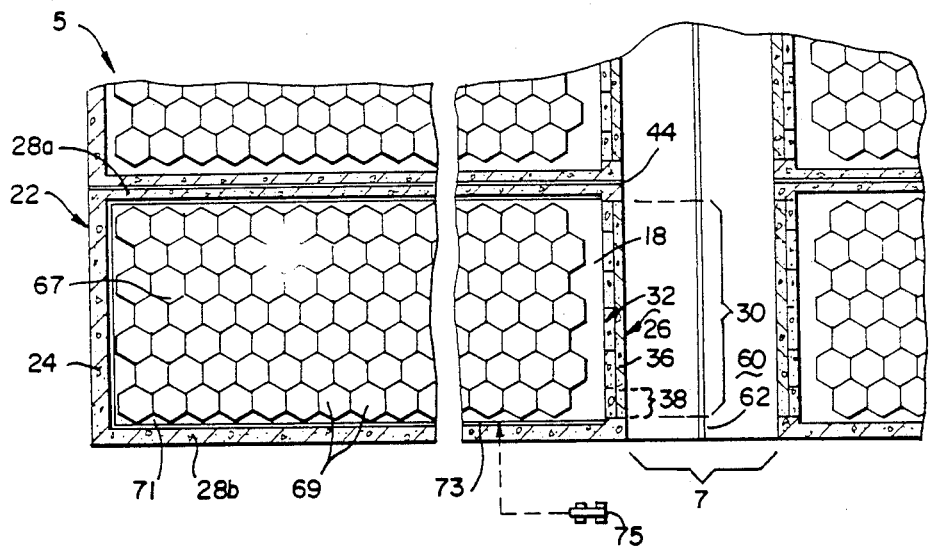
FIG. 5C is an enlarged plan view of the vault system with the earth cap and ceiling slabs removed therefrom.

With specific reference now to FIG. 5C, each of the vault cells 5 includes a wall assembly 22 which circumscribes the edge of the floor slab 18 and is preferably integrally formed therewith. The wall assembly 22 includes a back wall 24, a front wall 26 and a pair of side walls 28a,28b. An accessway 30 subsumes all but the side edges of the front wall 26 in order to facilitate the loading of waste containers therein. The valance of the front wall 26 is formed from a removable wall structure 32 formed from interfitting concrete blocks 34, and a permanent wall 36 of poured concrete which covers the removable wall structure 32 after the cell 5 has been completely filled with containers of waste. In the preferred embodiment, both the floor slab 18 and all of the components of the wall assembly 22 are formed from steel reinforced concrete. Additionally, to facilitate access to the interior of the vault cell 5 after the removable wall structure 32 and the permanent wall 36 have been installed, the permanent wall 36 includes a frangible section 38 approximately one meter square and located in an upper corner of the permanent wall 36 as indicated. As will be discussed in more detail hereinafter, the frangible section 38 allows a corner of the permanent wall 36 to be neatly broken out in the event that the system operators wish to install a movable video camera within the cell 5.

With specific reference again to FIG. 5B, each of the vault cells 5 is provided with a ceiling slab 40 formed from a unitary section of reinforced concrete that is completely supported by the upper edges of the wall assembly 22. The front edge of the ceiling slab 40 includes a support ledge 42 for supporting the ceiling slab of the loading aisle 7 which will be discussed in detail shortly.

With reference now to FIGS. 5A, 5B and 5C, expansion joints 44 are provided between the side walls 2a,28b of adjacent vault Cells 5 so that each individual vault cell 5 may move in response to subsidence or seismic disturbances without necessarily applying large stresses on its neighbor cells. While the dimensions of the walls and the proportions of the vault cells 5 may vary considerably and still fall within the purview of the instant invention, the floor slab 18, back and front walls 24,26 of the wall assembly 22, and the ceiling slab 40 are each preferably one meter thick, while the side walls 28a,28b of adjoining cells 5 are each approximately 0.5 meters thick. Side walls 28a,28b which are not adjacent to the side walls of another cell 5 are preferably one meter thick as may be seen to side wall 28b in FIG. 5C. In the preferred embodiment, the length of each of the cells 5 is preferably about five times the cell width, for two reasons. First, such proportioning creates a favorable shield geometry when the system operator fills the vault cells 5 with radioactive waste by stacking it from the back wall 24 toward the front wall 26. This is due to the fact that the front most row of waste containers effectively blocks much, if not all, of the radiation emitted by the other rows of waste containers stacked behind the frontmost row. Second, such proportioning minimizes the sag experienced by the ceiling slab due to the relatively distance between the side walls 28a,28b which support it. This is an important advantage. as the ceiling slab 40 must not only support its own weight, but also the weight of the earth cap 11. In the preferred embodiment, each cell 5 is approximately 16×95 meters.

As may best be seen in FIG. 5B, the earth cap 11 which covers the ceiling slab 40 includes a water impermeable geomembrane cover 46 which overlies the upper surface of the ceiling slab 40, and a layer 48 of compacted clay approximately 0.66 meters thick which in turns overlies the geomembrane cover 46. The principal purpose of both the cover 46 and the clay layer 48 is, of course, to shed water away from the vault cells 5. The earth cap 11 further includes a water permeable geotextile 50 which covers the upper surface of the clay liner 48, as well as a filtered drainage layer consisting of sand and gravel 52 approximately 0.66 meters thick with overlies the geotextile fabric 50. Another layer of water permeable geotextile 54 covers the upper surface of the filtered drainage layer 52 so that the layer 52 is, in effect, "sandwiched" between the geotextile layers 50 and 54. A layer 56 of native soil overlies the geotextile layer 54 as shown. The purpose of the filtered drainage layer 52 and the two layers 50 and 54 of geotextile is to rapidly drain any water or other liquid which should permeate the native soil layer 56 so that the clay layer 48 and the geomembrane cover 46 may rapidly shed such water away. The structure of the loading aisle 7 is also clearly evident in FIG. 5B. Like the previously discussed vault cells 5, the loading aisle 7 also includes a floor slab 60 which overlies the previously discussed gravel drain layer 19, geomembrane 20, and compacted clay layer 21. A drain 62 is centrally disposed along the longitudinal axis of the floor slab 60. This drain 62 may take the form of a shallow trough approximately five centimeters deep and ten centimeters wide that is molded within the floor slab 60. Finally, the loading aisle 7 includes a ceiling slab 64 not unlike the ceiling slabs 40 of the vault cells 5. These ceiling slabs 64 are supported by the previously discussed ledges 42 which form an integral part of the front edges of each cell vault ceiling slab 40. In the preferred embodiment, the loading aisle 7 is 10-11 meters wide. As may best be seen in FIGS. 5C and 6A, the interior of each of the vault cells 5 is preferably loaded with a stacked array 67 of modular, interfitting waste containers 69 which, in the preferred embodiment, are hexagonal SUREPAK ® modules developed and patented by the Westinghouse Electric Corporation. The array 67 of waste containers 69 is spaced approximately 0.66 meters away from the inside surfaces of the assembly 22 in order to provide a monitoring aisleway 71 which is suitable for either a man or a monitoring device to move in. Moreover, a track 73 is preferably attached around side wall 28a, back wall 24, and side wall 28b as shown at a height which is approximately level with the top of the array 67. The purpose of the track 73 is to guide a motorized video camera 75 around the monitoring aisleway 71 in the event that a monitoring or a maintenance operation is necessitated within the interior of the vault cell 5. The preferred method of installing such a video camera 75 onto the track 73 is, of course, to remove one or more of the interfitting blocks 34 that forms the removable wall structure 32 before the permanent wall 36 is installed, and to remove frangible section 38 and one or more blocks 34 after wall 36 is installed.

While there are many advantages associated with the use of SUREPAK ® modules in conjunction with the vault cells 5, one advantage that should be expressly recognized is the fact that the physical dimensions of the SUREPAK ® modules allows the provision of the 0.66 meters wide monitoring aisleway 71 without any danger that a waste container 69 will fall into the aisleway 71 from the effect of a seismic disturbance. This arises from the fact that the diameter of the SUREPAK ® modules (which is approximately two meters) is over three times the width of the monitoring aisleway 71. Hence there is essentially no chance that any of the modules 69 will fall into the aisleway 71 and rupture on the floor slab 18 if the containers 69 are stacked in the mutually-continuous array 67 shown. If the waste containers 69 were made to be relatively small relative to the width of the monitoring aisleway 71, it is easy to see that one or more of such containers 69 could indeed fall into the monitoring aisleway 71.

Figure 6A:
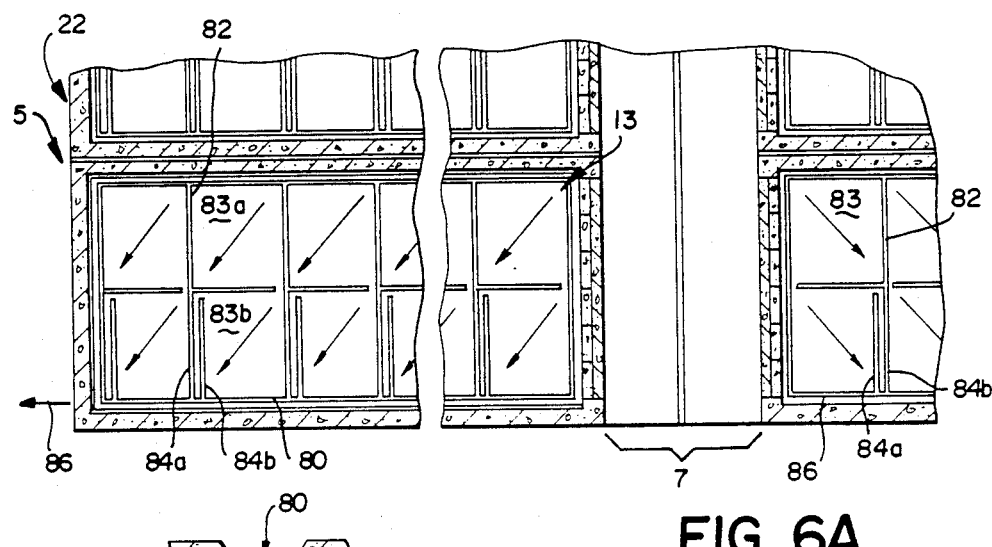
Figure 6B:
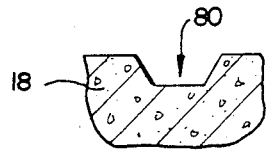

Turning now to FIGS. 6A, 6B and 6C, the drainage system 13 includes, for each vault cell 5, a central drainage channel 80 disposed along one edge of the floor slab 18 of each cell 5 as shown. As has been previously indicated, the floor slab 18 of each vault cell 5 is sloped at least one percent with respect to both its length and its width so that any liquids which collect upon the floor slab 18 tend to run toward one of the side edges of the slab 18. The drainage channel 80 is, of course, located along this lowest edge of the slab 18. In addition to the drainage channel 80, the system 13 includes a grid-like network of feeder channels 82 which ultimately empty into the main drainage channel 80. This gridwork of feeder channels 82 divides the area of the floor slab 18 into a plurality of rectangular zones of which 83a,83b are exemplary. Each of these zones are in turn drained by a separately identifiable feeder channel 84a,84b, respectively. The advantage of such a configuration of feeder channels 82 is that it allows the system operator to infer which zone or zones a leakage condition has occurred by merely noting which of the feeder channels 83a,83b is conveying water or other liquid to the drainage channel 80. Because the drainage channel 80 and its interconnections with the feeder channels 82 are incorporated within the monitoring aisleway 71, the system operator may utilize the previously described motorized video camera 75 to tell him which of the feeder channels 82 is conveying liquid to the main drainage channel 80 since wet concrete is substantially darker than dry concrete. In the alternative, electronic moisture sensors that generate remotely receivable signals maybe placed at the junctions between the feeder channels 82 and the main drainage channel 80.

With reference now to FIG. 6C and FIG. 7, the drainage channel 80 of each of the vault cells 5 is connected to a primary cell drainage conduit 86 which in turn is connected to a manifold conduit 90. Also connected to the manifold conduit 90 is a secondary drainage conduit 88 which is disposed beneath the floor slab 18 of each of the vault cells 5. The purpose of each of the secondary drainage conduits 88 is to drain any water or other liquids which may collect within the gravel layer 19 and geomembrane 20 which exist beneath the floor slabs 18 of each cell 5. Such liquid might collect within the gravel layer 19 as the result of a crack in the floor slab 18, or as the result of a substantial rise in the subterranean water table.

A moisture detector 94 is disposed in each of two pipe segments which separately interconnect the ends of the primary and secondary drainage conduits 86 and 88 with the manifold conduit 90. The moisture detector 94 may take a variety of forms. In one embodiment of the invention, the moisture detector 94 is simply a float disposed within a transparent elbow. In the alternative, moisture detector 94 may be any one of a number of commercially available electronic devices. A sample collection tap 96 is also provided at the end of both the primary and the secondary drainage conduits 86 and 88. These taps 96 allow an operator walking within the access tunnel 15 to obtain a sample of any liquid leaking out either over or under the floor slab 18 so that the composition and radioactivity of the liquid may be tested. The ends of both the primary and secondary drainage conduits 86 and 88 also include a clean out port 98 so that the sediment or other obstructing material may be conveniently removed from these conduits.

With reference now to FIG. 7, the manifold conduit 90 to which the primary and secondary drainage conduits 86 and 88 of each of the vault cells 5 are connected ultimately drains into a liquid storage tank 100. A coupling 104 interconnects the terminus of the manifold conduit 90 with the tank 100. The tank 100 is further provided with a suction conduit 106 so that any liquid which collects therein may be conveniently and periodically removed. Additionally, electronic moisture detectors 108a,108b are provided at the lower portion of the collection tank 100 and at the terminus of the manifold 90, respectively. Each of these moisture detectors 108a,108b generates an electronic signal when liquid is detected either at the terminus of the manifold 90, or at the bottom of the collection tank 100. This signal may be remotely detected, as by for example a radio receiver of a data acquisition system, so that the system operators will know immediately when a leakage condition has occurred in one or more of the vault cells 5 without the necessity of manually inspecting the moisture detectors 94 disposed within the tunnel 15. Finally, a liquid level sensor 110 is provided within the collection tank 100. This liquid level sensor 110 likewise generates a remotely-receivable signal when the level of the liquid within the tank 100 rises above a predetermined level, thus alerting the system operators of the necessity of emptying the tank 100.

In the preferred method of the invention, the inspectable vault system 1 is constructed by first providing a recess in the earth, which may be either natural or formed by an excavation. Next, the compacted clay layer 21 is deposited over the recess, with the geomembrane 20 and gravel drain layer 19 following. The floor slab 18 of at least one vault cell 5 is then constructed. Thereafter, a wall assembly 22 is erected around the edges of the floor slab 18. Next, a ceiling slab is constructed over the top edges of the wall assembly 22. Following this, the track 73 is next installed around the interior of the wall assembly 22 in the configuration illustrated in FIG. 5C. After four disposal cells 5 have been constructed, the various layers of the earth can 11 are then deposited over the ceiling slab 40 of each.

At this juncture, all of the static loads that the vault cell 5 is expected to bear have been applied to each cell 5. It is therefore appropriate that a close inspection be made of the interior of each constructed vault cell 5 to make sure that there are no water conducting cracks or other structural flaws present therein. This is a relatively simple matter, since there is no radioactive waste within the cells 5 at this point, and since further the removable wall structure 32 and permanent wall 36 of the front wall 26 of each have not yet been built.

Concurrently with the construction of the vault cells 5, the floor slab 60 of the loading aisle 7 is also built so as the provide a clear and supporting surface for a shielded forklift to stack the previously described SUREPAK® modules within the vault cell 5.

If the vault cells 5 pass inspection after the earth cap 11 has been deposited thereover, radioactive waste is next loaded therein. The waste containers 69 are stacked in uniform rows from the back wall 24 toward the front wall 26 of each vault cell 5 until a densely stacked array 67 such as that illustrated in FIG. 5C is formed. During the waste loading operation, the system operators receive a minimum amount of radiation exposure due to the previously described shielding geometry afforded by the elongated shape of each of the vault cells 5. Additionally, the waste containers 69 are advantageously sheltered from the ambient weather during the loading operation (which may take as long as six months) thereby minimizing the amount of stray rain water which collects within the cell 5.

After a particular cell 5 has been fully loaded, the removable wall structure 32 is then constructed by stacking the plurality of interfitting blocks 34 into the configuration illustrated in FIG. 5B. When all the cells 5 of the system 1 have been completed and loaded, the permanent wall 36 of each is fabricated out of steel reinforced concrete, being careful to provide fracture lines and no reinforcement around the edges of frangible portion 38.

Both of the rows 3a,3b of vault cells 5 are built simultaneously in parallel, rather than completing one row 3a and then the other row 3b. Such parallel construction provides two opposing ledges 42 onto which the ceiling slab 64 of the loading aisle 7 may be built, which has the advantage of providing a water-shedding ceiling over at least part of the loading aisle 7.

In the event that one or more of the moisture detectors of the drainage system either remotely or manually indicates that a leakage condition has occurred within one of the cells 5 before permanent wall 36 has been fabricated, the system operators may lift out some of the interfitting blocks 34 that form the upper corner of the removable wall structure 32. A motorized video camera 75 may then be installed onto the track 73 in order to discover the specific zone 83a,83b where the leakage occurred. If the system operators decide that it would be necessary to remove the waste container 69 from a particular vault cell in order to repair a leakage condition, the wall 34 would be completely removed, and the contents of the damaged cell 5 would be temporarily moved into the empty cell 8 until the repair was completed, wherein upon the containers 69 could be reloaded into the repaired cells and the wall structure 32 and the interfitting blocks 34 reconstructed. Of course, the same procedure could be implemented after permanent wall 36 has been fabricated, albeit with somewhat more trouble, as the wall 36 of the leaking cell would have to be removed. Thus the invention provides an inspectable vault system in which structural flaws may be detected and corrected before any waste is loaded into any of the cells 5, and in which a drainage system tells the system operators of the occurrence as well as the location of a leakage condition. The invention also provides a system in which the contents of a damaged cell 5 may be conveniently and temporarily stored within an empty cell 8 until a repair has been effected. While the preferred embodiment of the invention is installed within a recess in the earth, the vault system of the invention may also be constructed and used above ground as well.

We claim:

1. An inspectable vault cell for the disposal of hazardous waste having a liquid collection and monitoring system, characterized by:
   a. a liquid impermeable floor slab having a drainage channel along one of its edges and being sloped so that liquid on said floor slab flow toward said drainage channel;
   b. a wall assembly disposed around the periphery of the floor slab, and
   c. a monitoring and inspection aisleway defined between the wall assembly and hazardous waste deposited on said floor slab for providing both an unobstructed view and convenient access to said drainage channel.
   said drainage channel of said floor slab being subsumed within said monitoring aisleway so that the location of the origination of a flow of liquid toward said drainage channel may be observed from said aisleway and easily accessed from said aisleway.

2. An inspectable vault cell as defined in claim 1, wherein said floor slab includes a plurality of feeder channels that communicate with said drainage channel, and wherein each feeder channel collects liquid from different zones of said floor slab and wherein the junction between each feeder channel and said drainage channel is observable and accessible from said aisleway.

3. An inspectable vault cell as defined in claim 2, wherein said feeder channels form a rectangular gridwork, and each individual feeder channel collects liquid from a different rectangular zone of said floor slab.

4. An inspectable vault cell as defined in claim 1, wherein said wall assembly includes an accessway for loading and unloading waste, and said vault cell further comprises a removable wall structure for closing the accessway that includes removable interfitting blocks.

5. An inspectable vault cell as defined in claim i, further comprising a track means mounted within said call assembly for supporting and guiding a visual monitoring device over said drainage channel.

6. An inspectable vault cell as defined in claim 1, wherein said drainage channel communicates with a drainage conduit located outside of the vault cell that has a means for indicating whether liquid is present in said conduit.

7. An inspectable vault cell as defined in claim 6, further comprising a subterranean tunnel for providing access to said liquid indicating means of said drainage conduit.

8. An inspectable vault cell as defined in claim 6, further comprising a liquid storage tank that communicates with said drainage conduit for capturing and storing liquid flowing out of the vault cell.

9. An inspectable vault cell as defined in claim 8, wherein said liquid storage tank has a suction conduit for removing liquid that collects within the tank.

10. An inspectable vault cell as defined in claim 6, wherein said means for indicating whether liquid is present automatically transmits a remote signal when liquid is detected.

11. A vault system for the disposal of hazardous waste formed from vault cells each of which has a liquid collection and monitoring system and comprises:
   a. a liquid impermeable floor slab having a drainage channel for Collecting liquids:
   b. a wall assembly disposed around the periphery of the floor slab;
   c. a monitoring and inspection aisleway defined between said wall assembly and waste disposed within the vault cell that encompasses said drainage channel to render said drainage channel observable and accessible from said aisleway, and
   d. a drainage conduit located outside of said vault cell having a means for indicating whether liquid is present in said conduit.

12. A vault system as defined in claim 11, further comprising a subterranean tunnel for providing access to said liquid indicating means of said drainage conduit.

13. A vault system as defined in claim 11, further comprising a liquid storage tank that communicates with said drainage conduit for capturing and storing liquid flowing out of the vault cell.

14. A vault system as defined in claim 13, wherein said liquid storage tank has a suction conduit for removing liquid that collects within the tank.

15. A vault system as defined in claim 11, wherein said means for indicating whether liquid is present automatically transmits a remote signal when liquid is detected.

16. A vault system as defined in claim 11, further comprising a manifold conduit that fluidly connects the drainage conduit of each vault cell to a storage tank that receives and stores liquid.

17. A vault system as defined in claim 11, wherein said floor slab includes a plurality of feeder channels that communicate with said drainage channel, and wherein each feeder channel collects liquid from different zones of said floor slab and each feeder channel is observable and accessible from said aisleway.

18. A vault system as defined in claim 17, wherein said feeder channels form a rectangular gridwork, and each individual feeder channel collects liquid from a different rectangular zone of said floor slab.

19. A vault system as defined in claim 11, wherein said wall assembly includes an accessway for loading and unloading waste, and said vault cell further comprises a removable wall structure for closing the accessway that includes removable interfitting blocks.

20. A vault system as defined in claim 11, further comprising a track means mounted within said wall assembly for supporting and guiding a visual monitoring device over said drainage channel.

21. A vault system for the disposal of hazardous waste having a plurality of vault cells, each of which has a liquid collection and monitoring system and comprises:
  a. a liquid impermeable floor slab having a drainage channel along one of its edges and being sloped so that liquids on said floor slab flow toward said drainage channel;
  b. a wall assembly disposed around the periphery of the floor slab;
  c. a ceiling slab overlying said wall assembly;
  d. a monitoring and inspecting aisleway defined between said wall assembly and waste disposed within said vault cell and encompassing said drainage channel so that the location of the origination of a flow of liquid toward said drainage channel may be observed and accessed from said aisleway, and
  e. a drainage conduit located outisde of said vault cell having a means for indicating whether liquid is present in said conduit.

22. A vault system as defined in claim 21, further comprising a track means mounted on said wall assembly for supporting and guiding a visual monitoring device over said drainage channel.

23. A vault system as defined in claim 22, wherein said monitoring device is a television monitoring unit that includes a television camera, a light source, and a drive means for moving the unit along the track means.

24. A vault system as defined in claim 22, wherein said wall assembly includes an accessway for loading and unloading waste, and said vault cell further comprises a removable wall structure for closing the accessway that includes removable interfitting blocks.

25. A vault system as defined in claim 24, further including a permanent accessway wall that covers said removable wall structure after said vault cell is filled with waste, wherein said permanent accessway wall includes a weakened, frangible portion for forming an opening for the introduction of said monitoring unit.

26. A vault system as defined in claim 21, wherein said floor slab includes a plurality of feeder channels that communicate with said drainage channel, and wherein each feeder channel collects liquid from different zones of said floor slab and wherein the junction between each feeder channel and said drainage channel is observable and accessible from said aisleway.

27. A vault system as defined in claim 26, wherein said feeder channels form a rectangular gridwork, and each individual feeder channel collects liquid from a different rectangular zone of said floor slab.

28. A vault system as defined in claim 21, wherein said floor slab is sloped between one and three percent with respect to the horizontal.

29. A vault system as defined in claim 21, further comprising a subterranean tunnel for providing access to said liquid indicating means of said drainage conduit.

30. A vault system as defined in claim 21, further comprising a manifold conduit that fluidly connects the drainage conduit of each vault cell to a storage tank that receives and stores liquid.

* * * * *